(12) United States Patent
Tsuda

(10) Patent No.: US 8,711,169 B2
(45) Date of Patent: Apr. 29, 2014

(54) IMAGE BROWSING DEVICE, COMPUTER CONTROL METHOD AND INFORMATION RECORDING MEDIUM

(75) Inventor: Munetaka Tsuda, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 616 days.

(21) Appl. No.: 12/297,390

(22) PCT Filed: Apr. 6, 2007

(86) PCT No.: PCT/JP2007/057765
§ 371 (c)(1),
(2), (4) Date: Jan. 9, 2009

(87) PCT Pub. No.: WO2007/123009
PCT Pub. Date: Nov. 1, 2007

(65) Prior Publication Data
US 2009/0303246 A1  Dec. 10, 2009

(30) Foreign Application Priority Data
Apr. 21, 2006  (JP) .................................. 2006117985

(51) Int. Cl.
*G09G 5/02* (2006.01)
*G06T 15/00* (2011.01)
*G06T 11/20* (2006.01)
*G06F 3/048* (2013.01)

(52) U.S. Cl.
USPC ............ 345/592; 345/419; 345/440; 715/781

(58) Field of Classification Search
USPC .................................................. 345/440, 592
See application file for complete search history.

(56) References Cited

U.S. PATENT DOCUMENTS

2002/0190989 A1* 12/2002 Kamata et al. ............... 345/440

2004/0209688 A1* 10/2004 Mizuki et al. .................. 463/36
(Continued)

FOREIGN PATENT DOCUMENTS

JP          10307936          11/1998
(Continued)

OTHER PUBLICATIONS

English translation of International Preliminary Report dated Nov. 17, 2008 from corresponding PCT/JP07/057765.
(Continued)

*Primary Examiner* — Xiao M. Wu
*Assistant Examiner* — Matthew D Salvucci
(74) *Attorney, Agent, or Firm* — Katten Muchin Roseman LLP

(57) ABSTRACT

To provide an image viewing device for enabling a user to readily find their desired image. An image viewing device comprises a viewpoint position moving unit for moving a position of a viewpoint (54) in a virtual space (50) where one or more image objects (52) are placed, according to a viewpoint moving operation carried out by a user; a far-near value obtaining unit for obtaining a far-near value indicating an extent of apartness between the position of the viewpoint (54) and the positions of the respective image objects (52); a semi-transparency degree determination unit for determining a semi-transparency degree of the respective image object (52), based on the respective far-near value obtained by the far-near value obtaining unit; a space image production unit for producing a space image showing a picture obtained by viewing the virtual space (50) from the position of the viewpoint (54), according to the semi-transparency degree of the respective image object, (52), determined by the semi-transparency degree determination unit; and a space image display unit for displaying the space image produced by the space image production unit.

12 Claims, 11 Drawing Sheets

(56) References Cited

U.S. PATENT DOCUMENTS

2006/0262116 A1* 11/2006 Moshiri et al. ................ 345/419
2007/0257912 A1* 11/2007 Repin ........................... 345/426

FOREIGN PATENT DOCUMENTS

| JP | 2001143099 | 5/2001 |
| JP | 200430122 | 1/2004 |
| JP | 2006107170 | 4/2006 |

OTHER PUBLICATIONS

International Search Report dated Jun. 26, 2007 from corresponding PCT/JP07/057765.

* cited by examiner

FIG.3
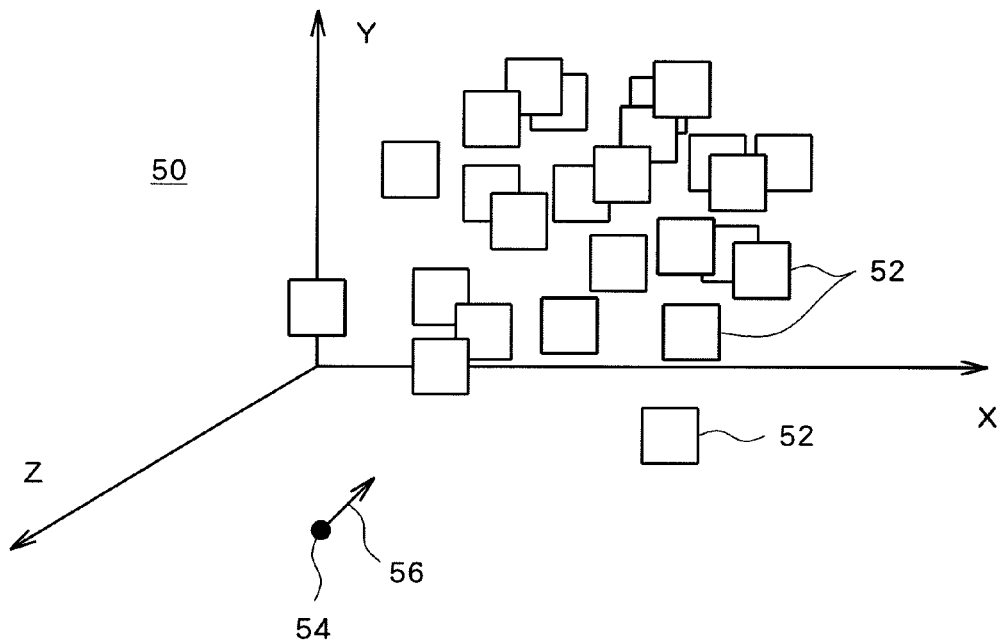
FIG.4
| IMAGE ID | THUMBNAIL DATA | ORIGINAL DATA | POSITION |
|----------|----------------|---------------|----------|
| 001 | 001S.jpg | 001.jpg | $(X_{001}, Y_{001})$ |
| 002 | 002S.jpg | 002.jpg | $(X_{002}, Y_{002})$ |
FIG.5
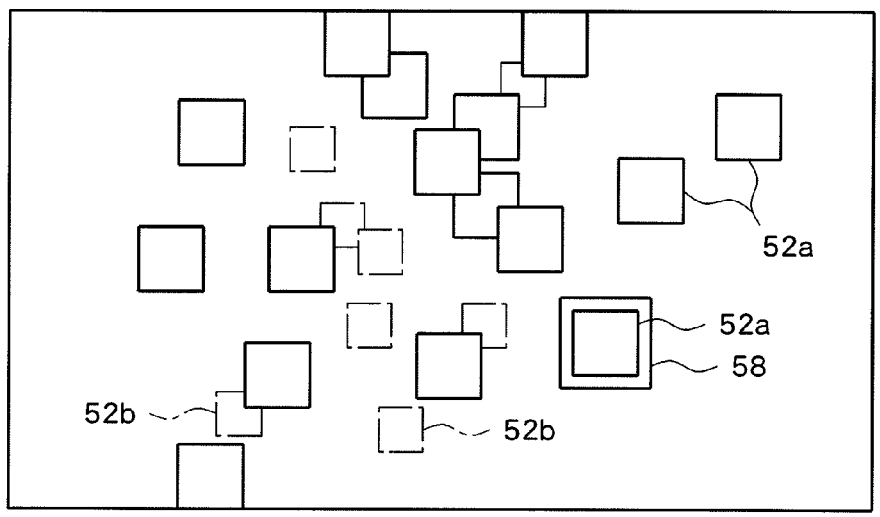

FIG. 10
(a)
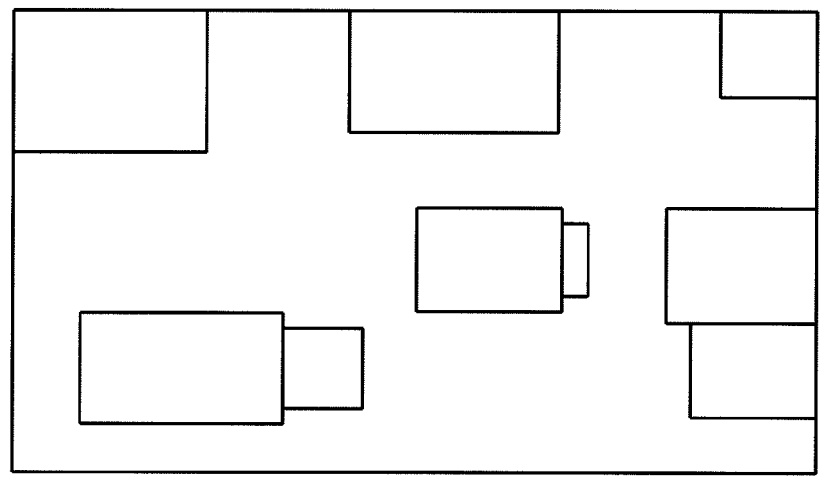
(b)
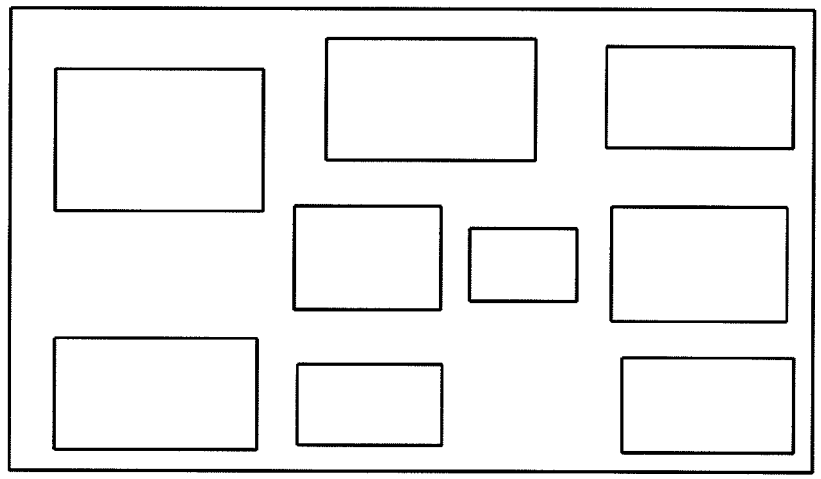

FIG. 13
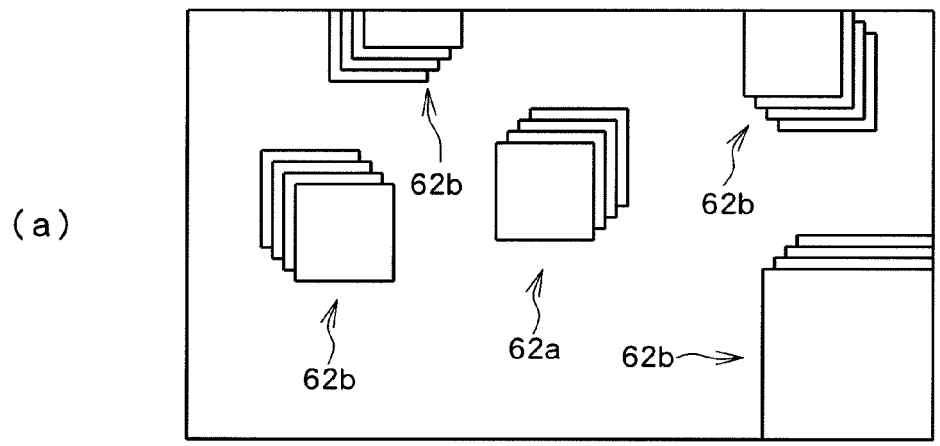
(a)
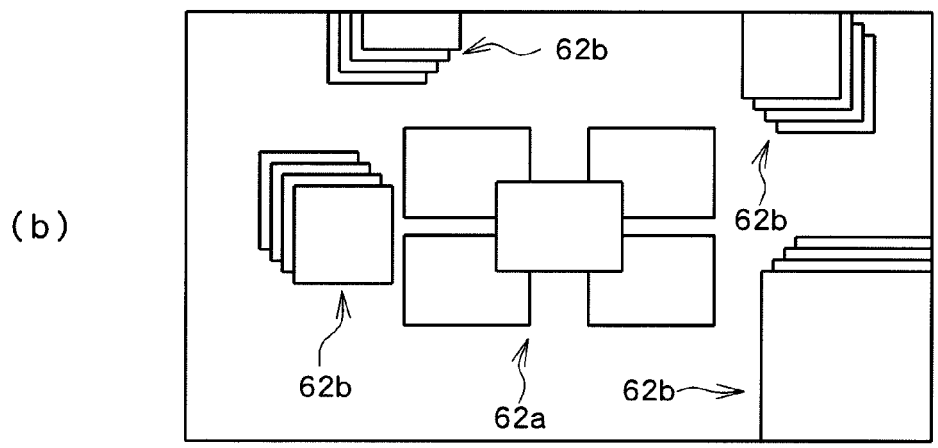
(b)
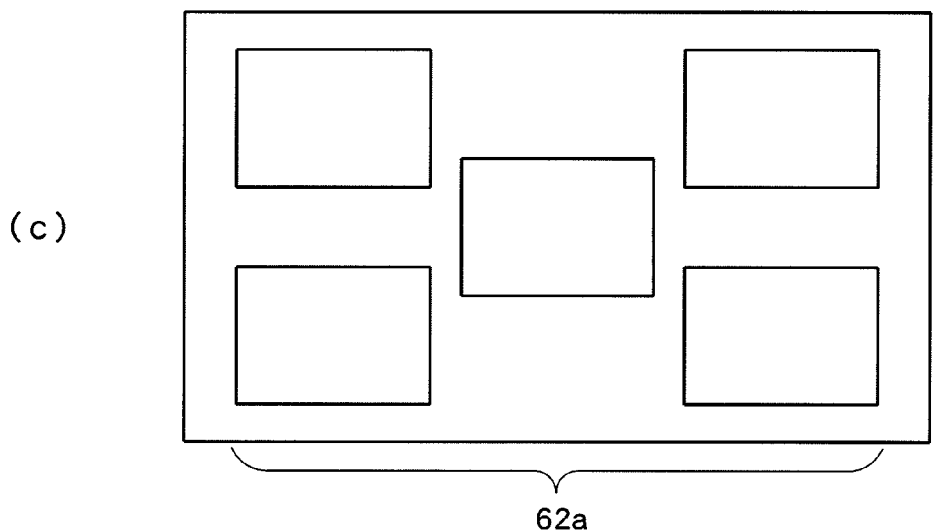
(c)

FIG.14

| IMAGE GROUP ID | IMAGE ID | THUMBNAIL DATA | ORIGINAL DATA | RETRACTED POSITION | EXTENDED POSITION |
|---|---|---|---|---|---|
| G001 | 001 | 001S.jpg | 001.jpg | $(X_{001}, Y_{001})$ | $(X'_{001}, Y'_{001})$ |
|  | 002 | 002S.jpg | 002.jpg | $(X_{002}, Y_{002})$ | $(X'_{002}, Y'_{002})$ |
|  | 003 | 003S.jpg | 003.jpg | $(X_{003}, Y_{003})$ | $(X'_{003}, Y'_{003})$ |
| G002 | 004 | 004S.jpg | 004.jpg | $(X_{004}, Y_{004})$ | $(X'_{004}, Y'_{004})$ |
|  | 005 | 005S.jpg | 005.jpg | $(X_{005}, Y_{005})$ | $(X'_{005}, Y'_{005})$ |

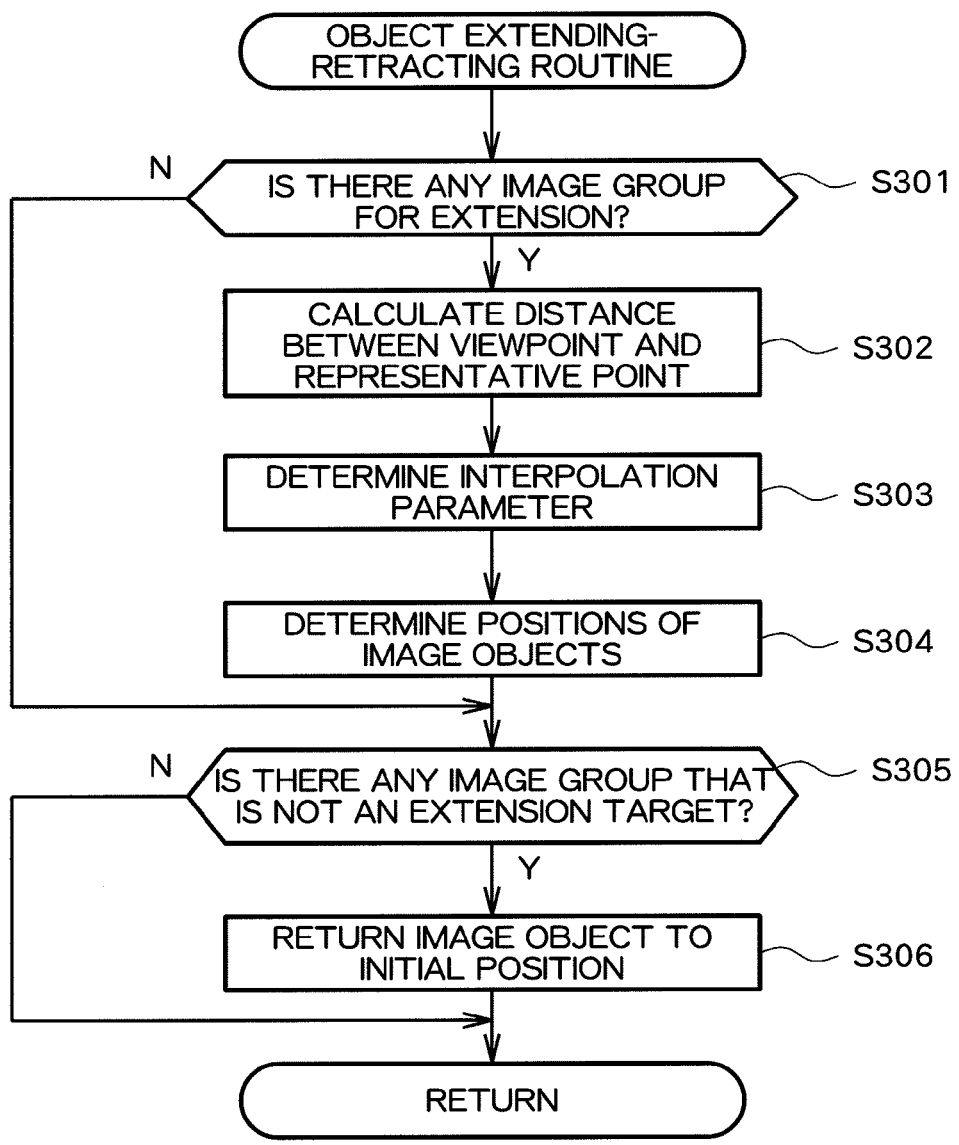

IMAGE BROWSING DEVICE, COMPUTER CONTROL METHOD AND INFORMATION RECORDING MEDIUM

TECHNICAL FIELD

The present invention relates to an image viewing device, a computer control method, and an information storage medium, and in particular, to an image viewing device, a computer control method, and an information storage medium for viewing an image placed in a virtual space.

BACKGROUND ART

There is known a technique (e.g., Patent Document 1 mentioned below) for displaying on a monitor a picture obtained by viewing a virtual space from a viewpoint in a viewing direction, the virtual space being created in a computer, where a plurality of images are placed according to the mutual relevance thereof and the viewpoint moves in the virtual space according to a user operation. According to this technique, the user can find their desired image by moving the viewpoint to thereby update the display on the monitor.

Patent Document 1: Japanese Patent Laid-open Publication No. 2004-30122

DISCLOSURE OF INVENTION

Problem to be Solved by the Invention

According to the above described conventional art, however, when an enormous number of images are placed in the virtual space and many images are thus shown on the monitor, the user cannot readily find their desired image.

The present invention has been conceived in view of the above, and aims to provide an image viewing device, a computer control method, and an information storage medium for enabling a user to readily find their desired image.

Means for Solving the Problem

In order to attain the above described objects, according to one aspect of the present invention, there is provided an image viewing device, comprising viewpoint position moving means for moving a position of a viewpoint in a virtual space where one or more image objects are placed, according to a viewpoint moving operation carried out by a user; far-near value obtaining means for obtaining a far-near value indicating an extent of apartness between the position of the viewpoint and a position of the respective image object; semi-transparency degree determination means for determining a semi-transparency degree of the respective image object, based on the respective far-near value obtained by the far-near value obtaining means; space image production means for producing a space image showing a picture obtained by viewing the virtual space from the position of the viewpoint, according to the semi-transparency degree of the respective image object, determined by the semi-transparency degree determination means; and space image display means for displaying the space image produced by the space image production means.

In one embodiment of the present invention, the image viewing device may further comprise distinctive display means for distinctively displaying an image object to be displayed in detail among the one or more image objects, according to a detail display operation carried out by the user; distinctive display switching means for switching the image object to be displayed in detail, according to an object switching operation carried out by the user; and distinctive display switching destination determination means for determining an image object, among the one or more images, to which the image object to be displayed in detail by the distinctive display switching means is switched, based on the respective far-near value obtained by the far-near value obtaining means.

In one embodiment of the present invention, the semi-transparency degree determination means may determine the semi-transparency degree of the respective image object such that the image object having the far-near value smaller than a predetermined first value is shown transparent, the image object having the far-near value equal to or larger than the first value and smaller than a predetermined second value is shown opaque, and the image object having the far-near value equal to or larger than the second value is shown semi-transparent.

In one embodiment of the present invention, the image viewing device may further comprise object position moving means for moving a position of the image object located ahead of the viewpoint in the virtual space. In this embodiment, the object position moving means may move the position of the image object so as to overlap less with another image object when viewed from the view point. Also, the object position moving means may move the position of the image object according to a state of the viewpoint.

According to another aspect of the present invention, there is provided a computer control method, comprising a viewpoint position moving step of moving a position of a viewpoint in a virtual space where one or more image objects are placed, according to a viewpoint moving operation carried out by a user; a far-near value obtaining step of obtaining a far-near value indicating an extent of apartness between the position of the viewpoint and a position of the respective image object; a semi-transparency degree determination step of determining a semi-transparency degree of the respective image object, based on the respective far-near value obtained at the far-near value obtaining step; a space image production step of producing a space image showing a picture obtained by viewing the virtual space from the position of the viewpoint, according to the semi-transparency degree of the respective image object, determined at the semi-transparency degree determination step; and a space image display step of displaying the space image produced at the space image production step.

According to another aspect of the present invention, there is provided an information storage medium storing a program for causing a computer to function as viewpoint position moving means for moving a position of a viewpoint in a virtual space where one or more image objects are placed, according to a viewpoint moving operation carried out by a user; far-near value obtaining means for obtaining a far-near value indicating an extent of apartness between the position of the viewpoint and a position of the respective image object; semi-transparency degree determination means for determining a semi-transparency degree of the respective image object, based on the respective far-near value obtained by the far-near value obtaining means; space image production means for producing a space image showing a picture obtained by viewing the virtual space from the position of the viewpoint, according to the semi-transparency degree of the respective image object, determined by the semi-transparency degree determination means; and space image display means for displaying the space image produced by the space image production means. The program may be stored in a

BRIEF DESCRIPTION OF DRAWINGS

FIG. 3 is a diagram showing one example of a virtual space;

FIG. 4 is a diagram schematically showing content stored in a space database;

FIG. 5 is a diagram showing one example of a space image shown on the monitor;

FIG. 10 is a diagram showing another example of a space image shown on the monitor;

FIG. 13 is a diagram showing still another example of the space image shown on the monitor;

FIG. 14 is a diagram schematically showing content stored in the space database according to a modified example; and FIG. 15 is a flowchart of an object extending-retracting process.

BEST MODE FOR CARRYING OUT THE INVENTION

In the following, one embodiment of the present invention will be described in detail with reference to the accompanying drawings.

Figure 1:
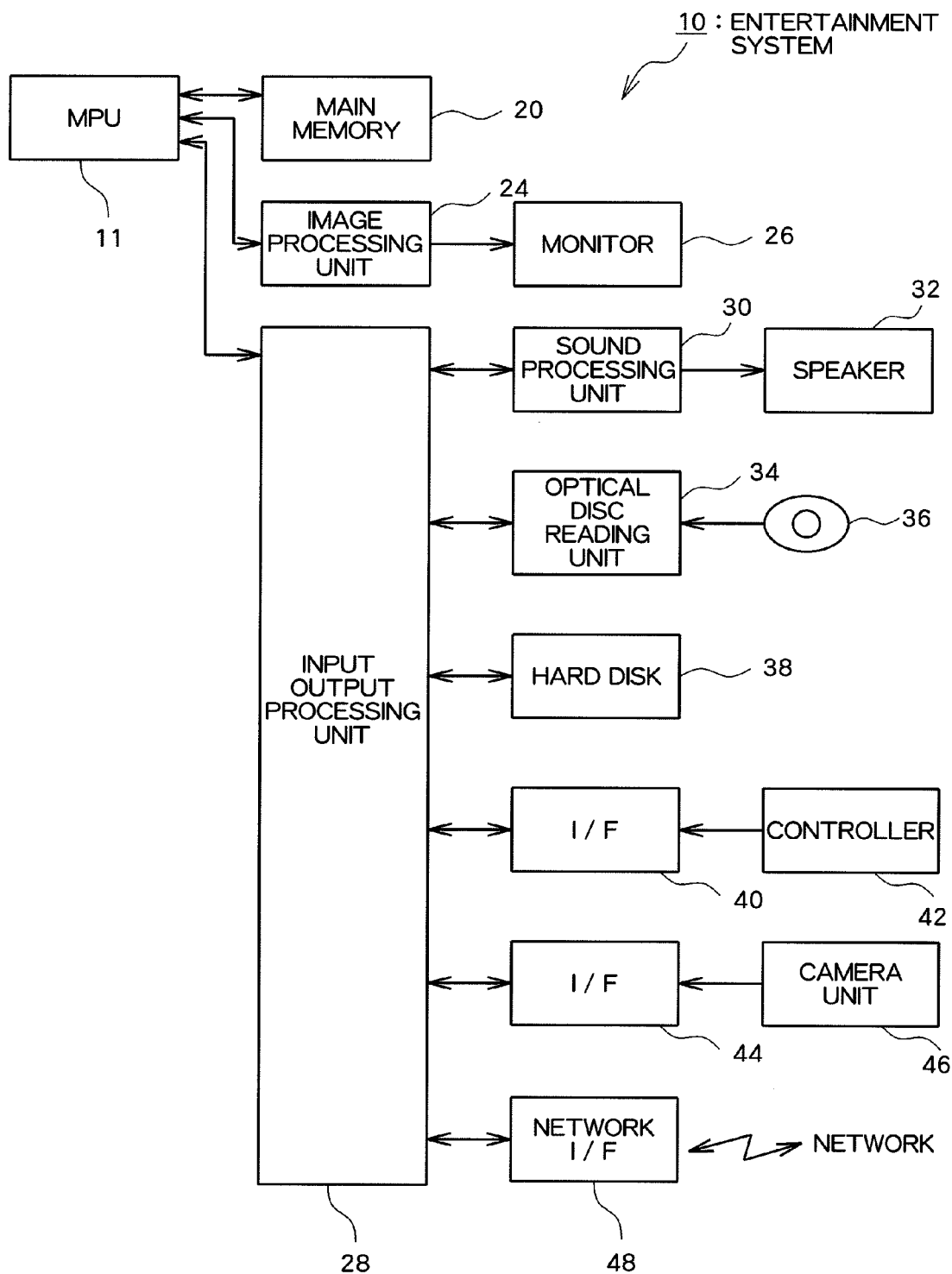
FIG. 1 is a diagram showing a hardware structure of an entertainment system (an image viewing device) according to an embodiment of the present invention.

FIG. 1 is a diagram showing a hardware structure of an entertainment system (an image viewing device) according to this embodiment. As shown in the drawing, the entertainment system 10 is a computer system comprising an MPU (Micro Processing Unit) 11, a main memory 20, an image processing unit 24, a monitor 26, an input output processing unit 28, a sound processing unit 30, a speaker 32, an optical disc reading unit 34, an optical disc 36, a hard disk 38, interfaces (I/F) 40, 44, an controller 42, a camera unit 46, and a network interface 48.

Figure 2:
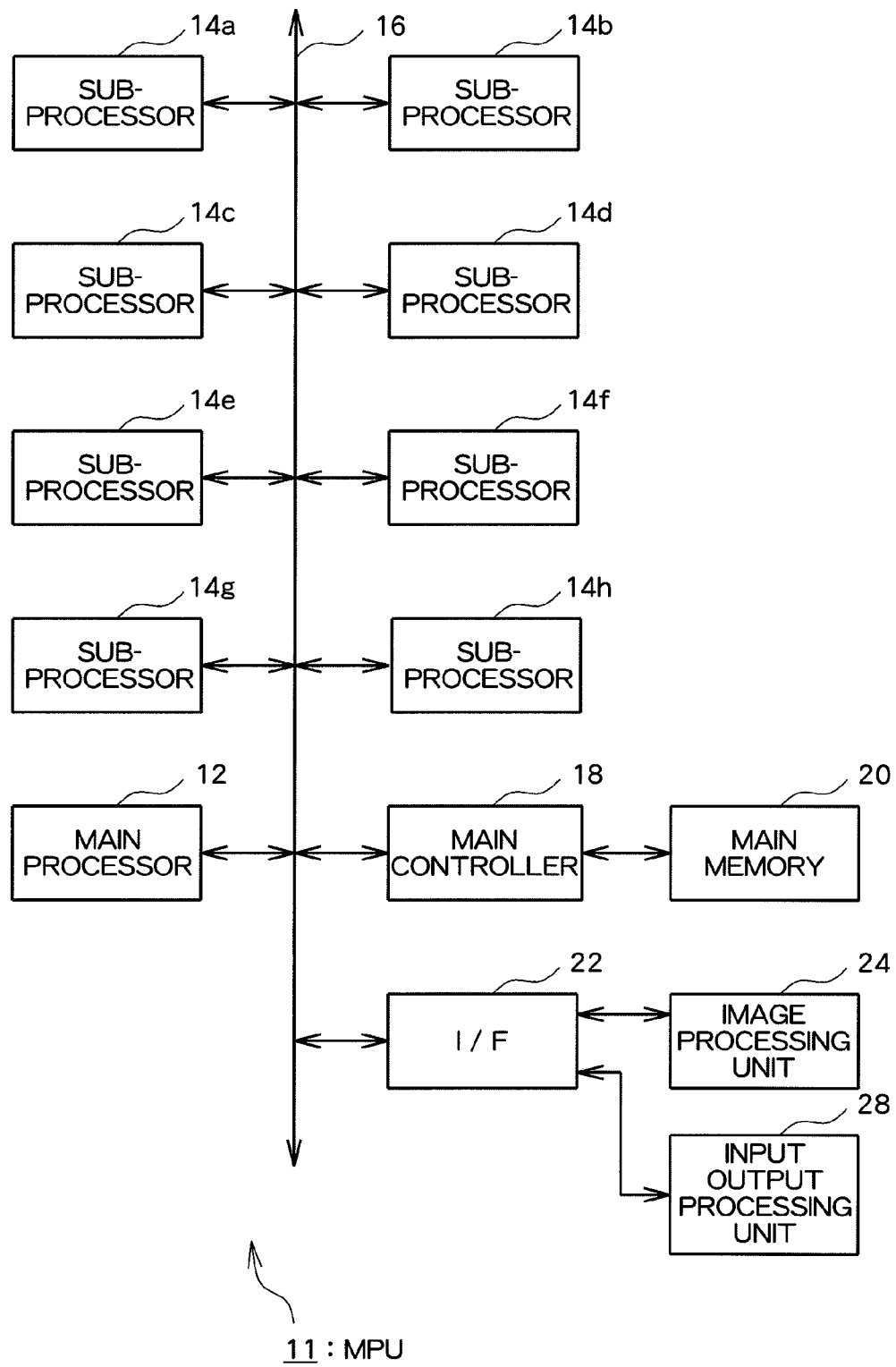
FIG. 2 is a diagram showing a detailed structure of an MPU.

FIG. 2 is a diagram showing a structure of the MPU 11. As shown in the drawing, the MPU 11 comprises a main processor 12, sub-processors 14a, 14b, 14c, 14d, 14e, 14f, 14g, 14h, a bus 16, a memory controller 18, and an interface (I/F) 22.

The main processor 12 carries out various information processing and controls the sub-processors 14a to 14h, based on an operating system stored in a ROM (Read Only Memory) (not shown), a program and data read from an optical disc 36, such as, e.g., a DVD (Digital Versatile Disk)-ROM and so forth, and those supplied via a communication network and so forth.

The sub-processors 14a to 14h carry out various information processing according to an instruction from the main processor 12, and control the respective units of the entertainment system 10, based on a program and data read from the optical disc 36, such as, e.g., a DVD-ROM and so forth, and those supplied via a communication network and so forth.

The bus 16 is used for switching an address and data among the respective units of the entertainment system 10. The main processor 12, sub-processors 14a to 14h, memory controller 18, and interface 22 are mutually connected via the bus 16 for data exchange.

The memory controller 18 accesses the main memory 20 according to an instruction from the main processor 12 and the sub-processors 14a to 14h. A program and data read from the optical disc 36 and/or hard disk 38 and those supplied via a communication network is written into the main memory 20 when necessary. The main memory 20 is used as a working memory of the main processor 12 and the sub-processors 14a to 14h.

The image processing unit 24 and input output processing unit 28 are connected to the interface 22. Data exchange between the main processor 12 and sub-processors 14a to 14h and the image processing unit 24 or input output processing unit 28 is carried out via the interface 22.

The image processing unit 24 comprises a GPU (Graphical Processing Unit) and a frame buffer. The GPU renders various screen images into the frame buffer, based on the image data supplied from the main processor 12 and/or the sub-processors 14a to 14h. A screen image rendered in the frame buffer is converted into a video signal at a predetermined time before being output to the monitor 26. It should be noted that the monitor 26 may be, e.g., a home-use television set receiver.

The input output processing unit 28 is connected to the sound processing unit 30, optical disc reading unit 34, hard disk 38, and interfaces 40, 44. The input output processing unit 28 controls data exchange between the main processor 12 and sub-processors 14a to 14h and the sound processing unit 30, optical disc reading unit 34, hard disk 38, interfaces 40, 44, and network interface 48.

The sound processing unit 30 comprises an SPU (Sound Processing Unit) and a sound buffer. The sound buffer stores various kinds of sound data, such as game music, game sound effects, a message, and so forth, read from the optical disc 36 and/or hard disk 38. The SPU reproduces the various kinds of sound data, and outputs via the speaker 32. It should be noted that the speaker 32 may be, e.g., a built-in speaker of a home-use television receiver.

The optical disc reading unit 34 reads a program and data recorded in the optical disc 36 according to an instruction from the main processor 12 and/or the sub-processors 14a to 14h. It should be noted that the entertainment system 10 may be formed capable of reading a program and data stored in a computer readable information storage medium other than the optical disc 36.

The optical disc 36 is a general optical disc (e.g., a computer readable information storage medium), such as, e.g., a DVD-ROM or the like. The hard disk 38 is a general hard disk device. Various programs and data are recorded in the optical disc 36 and the hard disk 38 in a computer readable manner.

The interfaces (I/F) 40, 44 are used for connecting various peripheral devices, such as the controller 42, camera unit 46, and so forth. Such an interface may be, e.g., a USB (Universal Serial Bus) interface.

The controller 42 serves as a general purpose operation input means for use by the user to input various operations (e.g., a game operation). The input output processing unit 28 scans the states of the respective units of the controller 42 every predetermined period of time (e.g., $\frac{1}{60}^{th}$ of a second), and supplies an operational signal describing the scanning result to the main processor 12 and sub-processors 14a to 14h.

The main processor 12 and sub-processors 14a to 14h determine the content of the operation carried out by the user, based on the operational signal. It should be noted that the entertainment system 10 is formed adapted to connection to a plurality of operating devices 42, so that the main processor 12 and sub-processors 14a to 14h carry out various processes, based on the operation signals input from the respective operating devices 42.

The camera unit 46 comprises, e.g., a publicly known digital camera, and inputs a captured black/white or grey-scaled or colored image every predetermined period of time (e.g., $1/60^{th}$ of a second). The camera unit 46 in this embodiment inputs a captured image as image data in the JPEG (Joint Photographic Experts Group) format. The camera unit 46 is mounted on the monitor 26, having the lens thereof, e.g., directed to the player, and connected via a cable to the interface 44. The network interface 48 is connected to the input output processing unit 28 and the network 50 to relay data communication made by the entertainment system 10 via the network 50 to another entertainment system 10.

In the following, a method for forming the entertainment system 10 having the above described hardware structure so as to operate as an image viewing device for managing many images and allowing a user to view the images will be described.

When the entertainment system 10 is formed as an image viewing device, data about many images is stored in the hard disk 38. The image data may be read from a storage medium, such as, e.g., the optical disc 36 or the like, downloaded via the network interface 48 from a device on a communication network, such as the Internet, or the like, or captured using the camera unit 46. The image data may have various contents, including what is captured by a user or by another person. Alternatively, the image data may be produced using paint software.

In this embodiment, data about thumb nail images each having a smaller data size is produced beforehand for these many images, and a virtual space where many image objects having the corresponding thumb nail images mapped thereon as a texture are placed is created in the entertainment system 10. FIG. 3 shows one example of the virtual space. As shown in the drawing, many image objects 52 are placed in the virtual space 50. Each image object 52 is a rectangular object having a thumb nail image, or a size-reduced version of an image owned by a user, to be described later, mapped thereon as a texture.

A view point 54 is defined in the virtual space 50, and a viewing direction 56 is defined with respect to the viewpoint 54. The viewpoint 54 can move in the virtual space 50 according to an operation carried out by the controller 42. The viewing direction 56 can be defined in any direction according to an operation carried out using the controller 42. The posture of each image object 52 is determined on a real time basis so as to face the viewpoint 54, and is thus switched as the viewpoint 54 moves.

FIG. 4 schematically shows the content stored in a space database describing the structure of the virtual space 50. The space database is created, e.g., in the hard disk 38, in which an image ID, or identification of image data, thumb nail image data of the same, original image data of the same, and positional coordinates of an image object 52 related to the same in the virtual space 50 are stored so as to be associated with one another. The above described information is prepared for all image data to be viewed by the user, and managed by the space database.

It should be noted that the position coordinates of the respective image objects 52 in the virtual space 50 are determined according to the attributes of the respective image data. That is, a characteristic vector indicating the characteristics of the respective image data is obtained based on the content of the image data (color information in use, space frequency information, recognition result such as face recognition and so forth) and attribute information (file stamp, file name, and content of other document data related to image data) of the image data, and the position coordinates of the image object 52 related to the image data may be determined based on the characteristic vector. With this arrangement, image objects 52 located closer to each other have images mapped thereon, respectively, which are similar to each other. With the above, the user can find an image object 52 related to their desired image, while relaying on the relative position of the respective image objects 52 in the virtual space 50.

Figure 6:
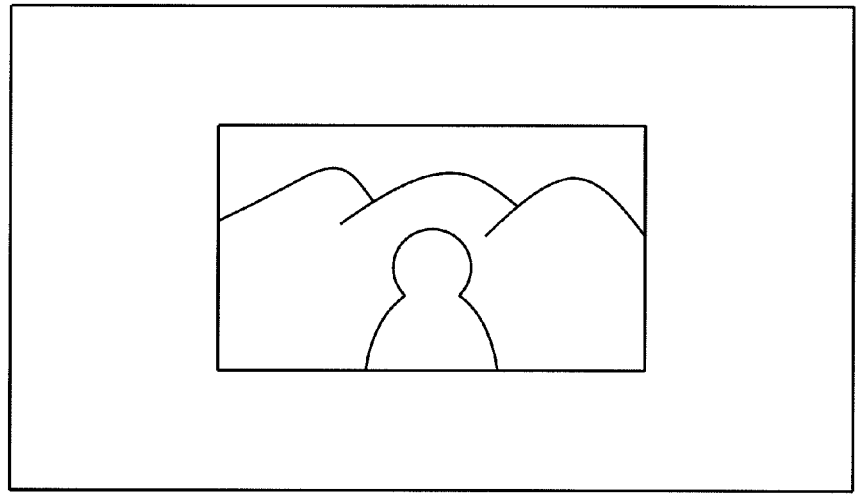
FIG. 6 is a diagram showing one example of a detailed image shown on the monitor.

In the entertainment system 10, the position coordinates of the respective image objects 52 are read with reference to the space database, and the postures of the same are determined based on the position coordinates of the viewpoint 54. Further, thumb nail image data is read and relevant thumb nail images are mapped onto their corresponding image objects 52. An image showing a picture obtained by viewing from the viewpoint 54 in the viewing direction 56, that is, a space image, is produced, and shown on the monitor 26. FIG. 5 shows one example of the space image. As shown in the drawing, many image objects 52 are shown in the space image, and a thumb nail image is shown opaque as a texture on a selection target image object 52a among the image objects 52 shown in the space image, and thumb nail images are shown semi-transparent as textures on non-selection target image objects 52b among them, or the rest of the image objects 52. In addition, a cursor image 58 is shown around one of the selection target image objects 52a. The cursor image 58 is used for indicating to a user a target to be displayed in detail. That is, at a time when a predetermined button of the controller 42 is pressed to thereby carry out a detail display operation, original image data corresponding to the selection target image object 52a then identified by the cursor image 58 is shown on the monitor 32. FIG. 6 shows image data displayed in detail as described above on the monitor 32.

As described above, in the space image shown on the monitor 26, a selection target image object 52a is shown opaque, while a non-selection target image object 52b is shown semi-transparent. In production of the space image, a view field range having the viewpoint 42 as the apex and a quadrangular pyramid shape extending ahead of the viewpoint 54, or in the viewing direction 54, is defined. Then, a far-near value indicating an extent of apartness of each image object 52 in the view field range relative to the viewpoint 54 is produced. In the following, the depth value of the position (a representative position) of each image object 52, when viewed from the viewpoint 54, that is, the Z value in the viewpoint coordinate system (a coordinate system having the viewpoint 54 as the origin and the viewing direction 56 as the z axis) is employed as a far-near value. An image object 52 placed in a position having a Z value within a predetermined first range is defined as a selection target image objects 52, while an image object 52 placed in a position having a Z value within a second range which is larger than the first range is defined as a non-selection target image object 52b. The non-selection target image object 52b is expressed semi-transparent in the space image. It should be noted that the distance between the viewpoint 54 and each image object may be used as a far-near value.

Figure 7:
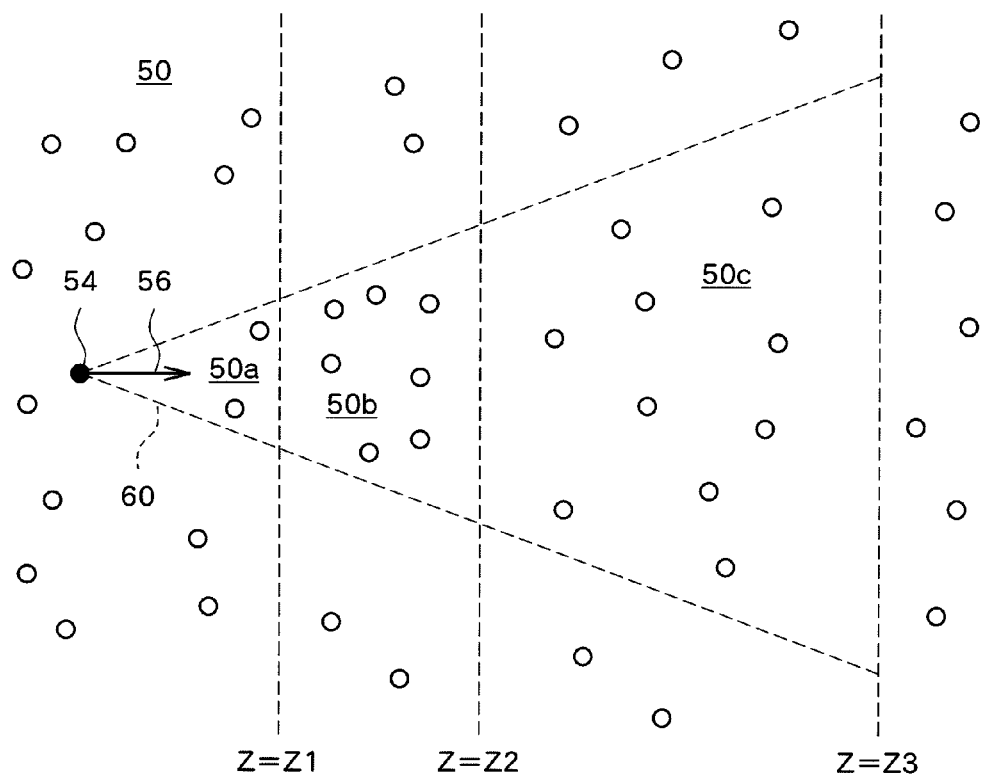
FIG. 7 is a diagram explaining a method for producing a space image.

FIG. 7 shows a picture obtained by viewing the virtual space 50 from the lateral side of the view field range, in which a white circle represents the position of each image object 52.

Figure 8:
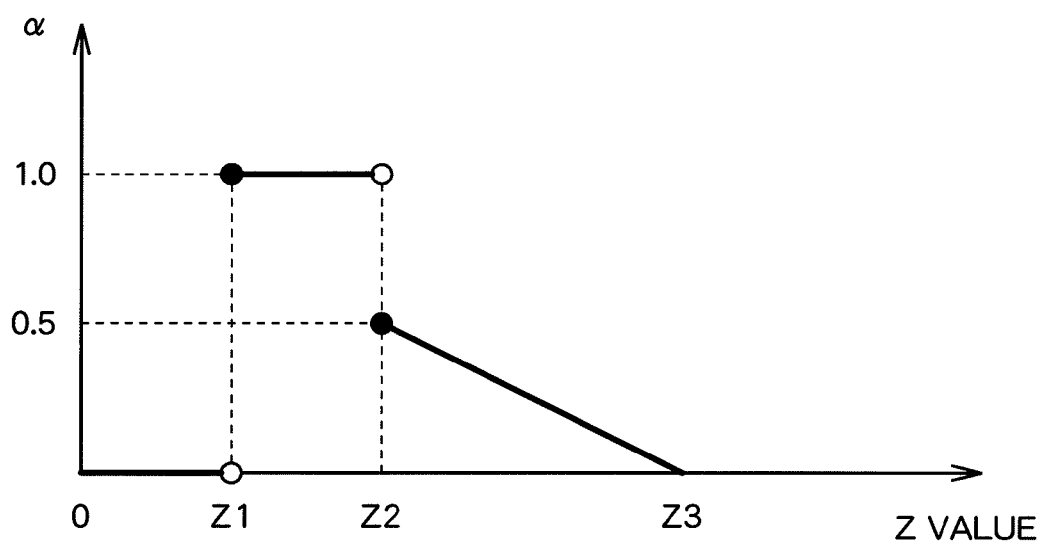
FIG. 8 is a diagram showing relation between a Z value of a representative point of each image object and an $\alpha$ value.

As shown in the drawing, a view field range 60 having a quadrangular pyramid shape is defined ahead of the viewpoint 54, that is, in the viewing direction 56. The view field range 60 includes a space area 50a with a Z value equal to or larger than 0 and smaller than Z1, a space area 50b with a Z equal to or larger than Z1 and smaller than Z2, and a space area 50c with a Z value equal to or larger than Z2 and smaller than Z3. An image object 52 placed in the space area 50a is rendered thoroughly transparent. An image object 52 placed in the space area 50b is selected as a selection target image object 52a and rendered opaque. An image object 52a placed within the space area 50c is selected as a non-selection target image object 52b and rendered semi-transparent. In order to change the degree of semi-transparency of each image object 52 in the view field range 60, as described above, the entertainment system 10 holds a semi-transparency degree function, as shown in FIG. 8, in the main memory 20. A far-near value of an image object 52 in the view field range 60 relative to the viewpoint 54, that is, the Z value, is obtained, and a semi-transparency degree (an a value) corresponding to the Z value is obtained using the function. As shown in the drawing, a semi-transparency degree of 0, that is, thorough transparent, is associated with a Z value equal to or larger than 0 and smaller than Z1; semi-transparency degree of 1.0, that is, opaque, is associated with a Z equal to or larger than Z1 and smaller than Z2; and a semi-transparency degree which gradually gets closer to 0, beginning with 0.5, as the Z value increases (departing from the viewpoint 54), is associated with a Z value equal to or larger than Z2. It should be noted that a semi-transparency degree equal to or larger than zero and smaller than one may be associated with a Z value equal to and larger than 0 and smaller than Z1 so that an image object 52 at a position having a Z value within that range may also be rendered semi-transparent.

Figure 9:
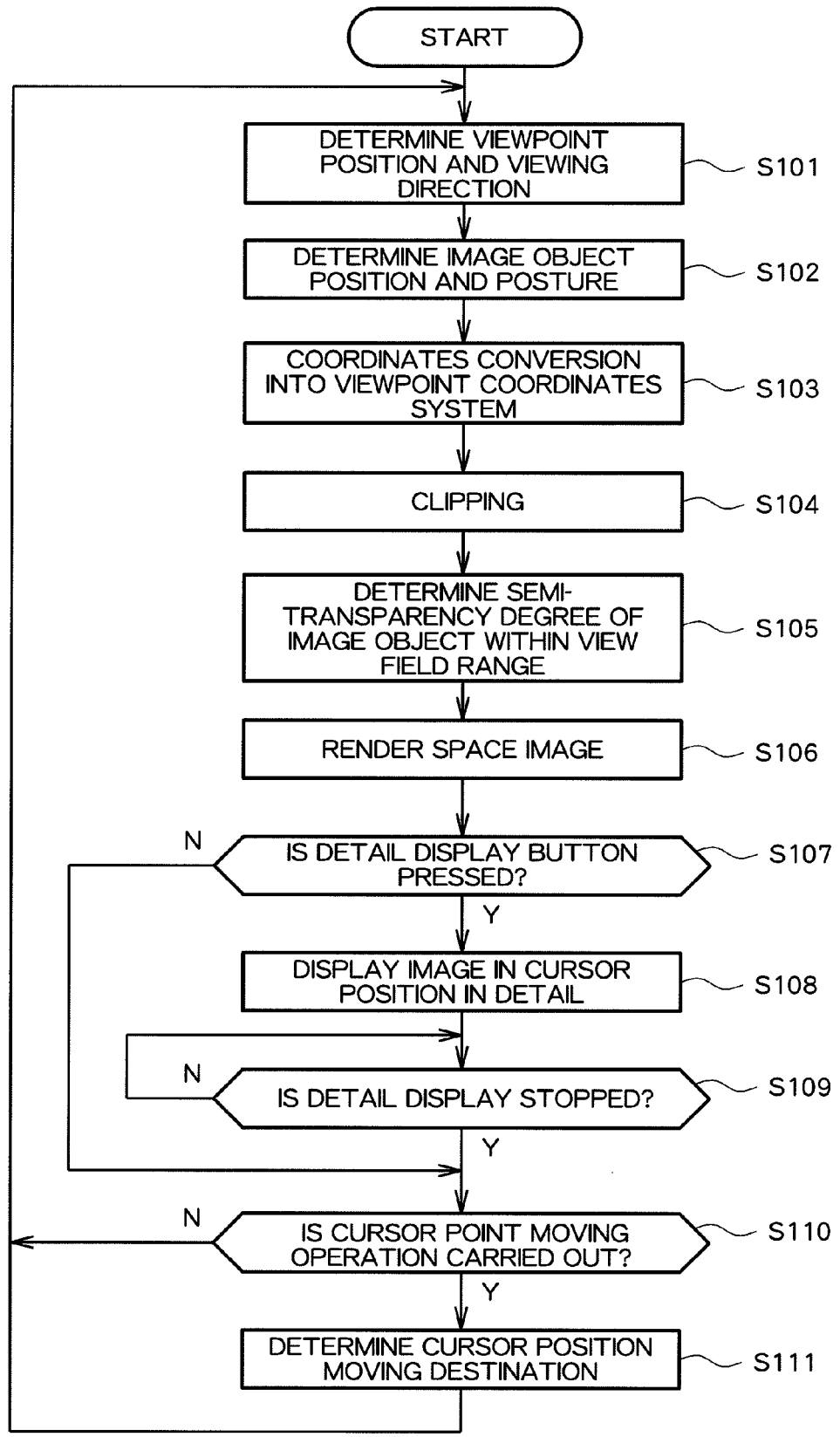
FIG. 9 is a flow diagram showing operation of an entertainment system according to an embodiment of the present invention.

FIG. 9 is an operational flowchart of the present entertainment system 10. The shown process is realized by executing an image viewing program recorded in the optical disc 32 in the entertainment system 10, and repetitively carried out every predetermined period of time (e.g., every $\frac{1}{60}^{th}$ of a second).

As shown in the drawing, initially, the entertainment system 10 determines the viewpoint 54 position and viewing direction 56 according to an operation signal input from the controller 42 (S101). The viewpoint 54 position and viewing direction 56 are determined, based on the immediately prior viewpoint 54 position and viewing direction 56, so as to change gradually.

Thereafter, the postures of all image objects 52 within the virtual space 50 are determined based on the position of the viewpoint 54 and those of the respective image objects 52, read from the space database (S102). In this case, the coordinates of the respective vertexes of the respective image objects 52 are calculated according to the postures of the respective image objects 52, determined as described above, and converted into those in the viewpoint coordinate system (S103). An image object 52 outside the view field range 60 is excluded from an object to be processed. An image object 52 located across an edge of the view field range 60 is subjected to clipping processing (S104).

Thereafter, the semi-transparency degree (an α value) of an image object 52 within the view field range 60 is determined according to the function shown in FIG. 8 (S105). Then, a picture obtained by viewing the image objects 52 within the view field range 60 from the viewpoint 54 is rendered as a space image in the frame buffer within the image processing unit 24, using the semi-transparency degree determined as described above (S106). In the above, a cursor image 58, which identifies one of the selection target image objects 52a with the Z equal to or larger than Z1 and smaller than Z2, is also rendered into the frame buffer.

Further, whether or not a detail display operation is carried out using the controller 42 is determined (S107). When it is determined that the operation is carried out, the original image data of the selection target image object 52a identified by the cursor image 58 is read from the space database, and shown enlarged on the monitor 26. Thereafter, whether or not an operation to stop the detail display is carried out using the controller 42 is determined. When it is determined the operation is carried out, the process at S110 is carried out. Meanwhile, when it is determined at S107 that the detail display operation is not carried out, the process at S108 and S109 are skipped.

At S110, whether or not a process to move the cursor image 58 is carried out using the controller 42 is determined. When it is determined that the operation is carried out, the cursor image 58 is moved to the position of another selection target image object 52 according to the content of the operation so that the cursor image 58 identifies the selection target image object 52, before the process returns to S101. Meanwhile, when it is determined at S110 that an operation to move the cursor image 58 is not carried out, the process at S111 is skipped, returning to the process at S101.

In the above described embodiment, a selection target image object 52a and a non-selection target image object 52b are selected from among the image objects 52 within the view field range 60, according to the far-near value indicating the degree of apartness between the viewpoint 54 and each image object 52, and the selection target image object 52a is expressed opaque in the space image, while the non-selection target image object 52b is expressed semi-transparent in the space image. As a result, an image object located apart from the viewpoint 54 by an appropriate distance is displayed with emphasis. This makes it easier for the user to find their desired image object 52 from among the enormous number of image objects 52 placed in the virtual space 50.

Also, as the image object 52 identified by the cursor image 58 is selected according to the user's operation to move the cursor from among the selection target image objects 52a selected based on the far-near value, the user can instantly designate a target for detail display.

It should be noted that this embodiment can be modified in various ways.

For example, in the case where data about many images is recorded in the hard disk 38 so that many image objects 52 are placed in the virtual space 50, images of many image objects 52 are included in the space image, including many image objects 50 either partly or entirely covered by other image object 52. In view of the above, it may be arranged such that the respective image objects 52 are maintained in the positions as stored in the space database while the viewpoint 52 is moving, and some or all of the image objects 52 may move and/or be reduced in size to be relocated so as not to be superimposed by other image object in the space image shown on the monitor 26 when the viewpoint 54 has been stopped for more than a predetermined period of time. FIG. 10(a) shows the space image with the viewpoint 54 moving in this modified example; FIG. 10(b) shows the space image with the viewpoint 54 kept stopped for more than a predetermined period of time. As shown in these drawings, the image objects 52 overlap with one another while the viewpoint 54 is moving, while the image object 52 do not overlap while the viewpoint 54 remains stopped for more than a predetermined period of time. With this arrangement, the user can check the content of all image objects 52 by reference to the space image.

Figure 11:
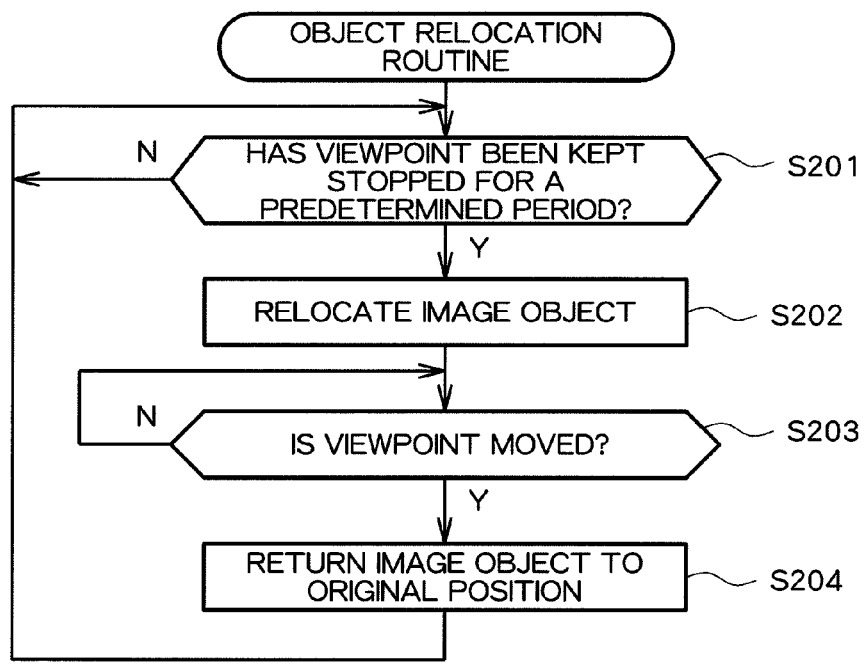
FIG. 11 is a flowchart of a process to relocate an object.

In this case, a process for an object relocation routine, shown in FIG. 11, will be carried out in parallel with the process of FIG. 9. In this routine, initially, whether or not the viewpoint 54 has been stopped for more than a predetermined period of time is monitored (S201). When it is determined that the viewpoint 54 has been stopped for more than a predetermined period of time, the image objects 62 within the view field range 60 are relocated so as not to overlap with one another when viewed from the viewpoint 54 (S202). In the above, the selection target image object 52*a* in the area 50*b* may be relocated with priority. When an operation to move the viewpoint 54 is thereafter carried out, using the controller 42 (S203), a process to return the image objects 62 to their original positions, that is, the positions as stored in the space database, is carried out (S204).

With the above, when the viewpoint 54 is moved near to the desired image object 52, with reference to the space image, and stopped there, the content of the selection target image object 52*a* located ahead of the viewpoint 54 is shown in the space image without overlapping. As a result, the user can more readily find their desired image.

Also, when more image data is recorded in the hard disk 38 and much more image objects 52 are placed in the virtual space 50, the initial positions (hereinafter referred to as a "retracted position") of image objects 52 related to mutually related image data may be determined such that the image objects 52 are aligned in a single line and thus placed concentrated. With the viewpoint approaching the image objects 52 in the concentrated disposition, the image objects 52 may be dispersed, moving to their extended positions.

Figure 12:
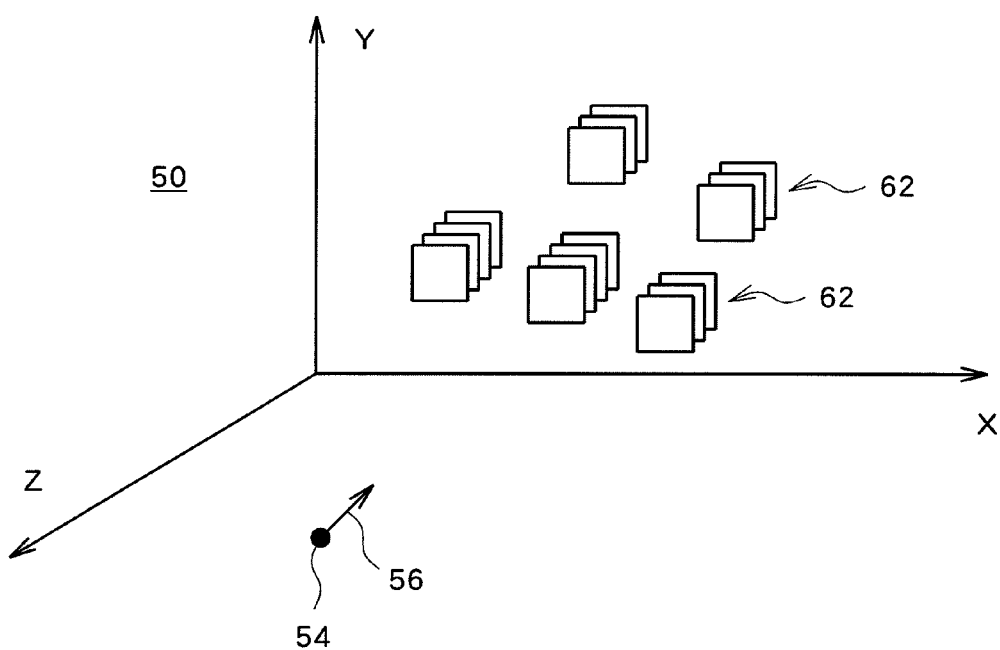
FIG. 12 is a diagram showing another example of the virtual space.

In this case, image object groups 62 each comprising image objects 5 related to mutually related image data are placed in the virtual space 50, as shown in FIG. 12, in which any image object group 62 is located ahead of the viewpoint 54, or in the viewing direction 56. With the distance between the viewpoint 54 and an image object group 62 becoming smaller than a predetermined distance, the respective image objects 52 constituting the image object group 62 begins moving. FIG. 13 shows the space image being switched in this modified example, in which the viewpoint 54 approaches any image object group 62 such that the image object group 62 is located ahead of the viewpoint 54. As a result, one image object group 62*a* is shown at the center of the space image, as shown in FIG. 13(*a*). With the viewpoint 54 thereafter further approaching the image object group 62*a*, the respective image objects 52 constituting the image object group 62*a* gradually move apart from their original positions (retracted positions), depending on the distance between the image object group 62*a* and the viewpoint 52, as shown in FIG. 13(*b*), until the respective image objects 52 constituting the image object group 62*a* are located in the respective extended positions. It should be noted that although it is described here that only the image objects 52 constituting the image object group 62*a* located ahead of the viewpoint 54 are moved from their respective retracted positions to their extended positions, the image objects 52 constituting the image object group 62*b*, shown around the image object group 62*a* in the space image may also similarly move from their respective retracted positions to their respective extended positions.

In this modified example, an image group ID identifying an image object group 62, an image ID, or identification of an image object 52 constituting the image object group 62, thumb nail image data about the respective image object 52, and original image data of the same, and retracted and extended positions of the same, may be stored so as to be associated with one another in the space database, as shown in FIG. 14.

In the process at S102 in FIG. 9, an object extending-retracting process, shown in FIG. 15, may be additionally carried out. In this process, initially, whether or not there exists any image object group 62 located ahead of the viewpoint 54 is determined (S301). When it is determined that such an image object group 62 exists, the distance between the position of the image object group 62 (e.g., the position of an image object 52 located closest to the viewpoint 54 among those constituting the image object group 62) and the viewpoint 54 is calculated (S302), and an interpolation parameter equal to or larger than 0 and equal to or smaller than 1 is calculated according to the distance calculated as described above (S303). For example, the interpolation parameter may be calculated such that the interpolation parameter 1 results with respect to the calculated distance being a predetermined first distance, and becomes smaller as the distance becomes shorter until the interpolation parameter results in 0 with respect to the calculated distance being a predetermined second distance which is slightly shorter than the first distance. Then, the retracted and extended positions of the respective image objects 52 constituting the image object group 62 specified at S301 are read from the space database shown in FIG. 14, and subjected to interpolation using the interpolation parameter calculated at S303, whereby the positions of the respective image objects 52 are calculated. In the above, the image object 52 is located in the retracted position thereof with respect to the interpolation parameter 1, and in the extended position thereof with respect to the interpolation parameter 0. With this arrangement, the image objects 52 constituting the image object group 62 located ahead of the viewpoint 54 move to the extended positions thereof as the distance to the viewpoint 52 becomes shorter.

Thereafter, it is determined whether or not there exists any image object 52 constituting the image object group 62, which is returning to the retracted position thereof as the relevant image object group 62 moves away from the position ahead of the viewpoint 54 (S305). When such an image object 52 exists, the interpolation parameter is adjusted to become closer to 1 so that the image objects 52 constituting the image object group 62 move closer to the retracted positions (S306). With the above arrangement, the respective image objects 52 return to the respective retracted positions thereof as time passes.

With the above described arrangement in which the position of an image object 54 located ahead of the viewpoint 54 in the virtual space 50 is moved to a different position, depending on the state of the viewpoint 52, such as the position of the viewpoint 54 or whether or not the viewpoint 54 is moving, and so forth, the content of the space image may be switched depending on the state of the viewpoint 54. This makes it much easier for the user to find their desired image.

The invention claimed is:
1. An image viewing device, comprising:
a viewpoint position mover for moving a position of a viewpoint in a virtual space where a plurality of image objects are placed, according to a viewpoint moving operation carried out by a user;
a far-near value obtainer for obtaining a far-near value indicating an extent of apartness between the position of the viewpoint and a position of the respective image object;
a semi-transparency degree determiner for determining a semi-transparency degree of the respective image object, based on the respective far-near value obtained by the far-near value obtainer;

a space image producer for producing a space image showing a picture obtained by viewing the virtual space from the position of the viewpoint, according to the semi-transparency degree of the respective image object, determined by the semi-transparency degree determiner;

a space image display for displaying the space image produced by the space image producer; and an image selector for selecting one or more selection image objects from one or more selection target image objects, wherein the image selector is configured to have the one or more selection image objects be selected by a user using a cursor, wherein the plurality of image objects include the one or more selection target image objects that are shown opaque and one or more non-selection target image objects that are shown semi-transparent, wherein the semi-transparency degrees of the one or more selection target image objects differ from the semi-transparency degrees of the one or more non-selection target image objects by at least a predetermined value, wherein said opaque image objects are selectable by said cursor and said semi-transparent image objects are not selectable by said cursor, and wherein the semi-transparency degree determiner determines the semi-transparency degree of the respective image object such that an image object having a far-near value smaller than a predetermined first value is shown transparent, an image object having a far-near value equal to or larger than the first value and smaller than a predetermined second value is shown opaque, and an image object having a far-near value equal to or larger than the second value is shown semi-transparent.

2. The image viewing device according to claim 1, further comprising:

a distinctive displayer for distinctively displaying an image object to be displayed in detail among the plurality of image objects, according to a detail display operation carried out by the user;

a distinctive display switcher for switching the image object to be displayed in detail, according to an object switching operation carried out by the user; and a distinctive display switching destination determiner for determining an image object, among the plurality of image objects, to which the image object to be displayed in detail by the distinctive display switcher is switched, based on the respective far-near value obtained by the far-near value obtainer.

3. The image viewing device according to claim 1, further comprising:

an object position mover for moving a position of the image object located ahead of the viewpoint in the virtual space.

4. The image viewing device according to claim 3, wherein the object position mover moves the position of the image object so as to overlap less with another image object when viewed from the viewpoint.

5. The image viewing device according to claim 3, wherein the object position mover moves the position of the image object according to a state of the viewpoint.

6. The image viewing device according to claim 1, wherein the selection target image objects have a far-near value equal to or larger than the first value and smaller than the second value, and wherein the non-selection target image objects have a far near-value equal to or larger than the second value.

7. The image viewing device according to claim 1, wherein said cursor is positioned so that it is around said selected target image object.

8. The image viewing device according to claim 1, wherein the cursor identifies the selected target image object.

9. The image viewing device according to claim 1, wherein said image selector is configured to have said user choose one of a plurality of target image objects within a field of view.

10. The image viewing device according to claim 9, wherein the image selector is configured to have a user click on one of the plurality of target image objects in order to select said image object.

11. A computer control method comprising:

a viewpoint position moving step of moving a position of a viewpoint in a virtual space where a plurality of image objects are placed, according to a view point moving operation carried out by a user;

a far-near value obtaining step of obtaining a far-near value indicating an extent of apartness between the position of the viewpoint and a position of the respective image object;

a semi-transparency degree determination step of determining a semi-transparency degree of the respective image object, based on the respective far-near value obtained at the far-near value obtaining step;

a space image production step of producing a space image showing a picture obtained by viewing the virtual space from the position of the viewpoint, according to the semi-transparency degree of the respective image object, determined at the semi-transparency degree determination step; and a space image display step of displaying the space image produced at the space image production step; and selecting one or more selection image objects from one or more selection target image objects, wherein the one or more selection image objects are selected by a user using a cursor, wherein the plurality of image objects include the one or more selection target image objects that are shown opaque and one or more non-selection target image objects that are shown semi-transparent and wherein the semi-transparency degrees of the one or more selection target image objects differ from the semi-transparency degrees of the one or more non-selection target image objects by at least a predetermined value, wherein said opaque image objects are selectable by said cursor and said semi-transparent image objects are not selectable by said cursor, and wherein the semi-transparency degree determiner determines the semi-transparency degree of the respective image object such that an image object having a far-near value smaller than a predetermined first value is shown transparent, an image object having a far-near value equal to or larger than the first value and smaller than a predetermined second value is shown opaque, and an image object having a far-near value equal to or larger than the second value is shown semi-transparent.

12. A non-transitory information storage medium storing a program for causing a computer to function as:

viewpoint position moving means for moving a position of a viewpoint in a virtual space where a plurality of image objects are placed, according to a viewpoint moving operation carried out by a user;

far-near value obtaining means for obtaining a far-near value indicating an extent of apartness between the position of the viewpoint and a position of the respective image object;

semi-transparency degree determination means for determining a semi-transparency degree of the respective image object, based on the respective far-near value obtained by the far-near value obtaining means;

space image production means for producing a space image showing a picture obtained by viewing the virtual space from the position of the viewpoint, according to the semi-transparency degree of the respective image object, determined by the semi-transparency degree determination means;

space image display means for displaying the space image produced by the space image production means; and image selection means for selecting one or more selection image objects from one or more selection target image objects, wherein the one or more selection image objects are selected by a user using a cursor, wherein the plurality of image objects include the one or more selection target image objects that are shown opaque and one or more non-selection target image objects that are shown semi-transparent and wherein the semi-transparency degrees of the one or more selection target image objects differ from the semi-transparency degrees of the one or more non-selection target image objects by at least a predetermined value, wherein said opaque image objects are selectable by said cursor and said semi-transparent image objects are not selectable by said cursor, and wherein the semi-transparency degree determiner determines the semi-transparency degree of the respective image object such that an image object having a far-near value smaller than a predetermined first value is shown transparent, an image object having a far-near value equal to or larger than the first value and smaller than a predetermined second value is shown opaque, and an image object having a far-near value equal to or larger than the second value is shown semi-transparent.

* * * * *